(12) United States Patent
Nicolas et al.

(10) Patent No.: US 6,593,944 B1
(45) Date of Patent: Jul. 15, 2003

(54) DISPLAYING A WEB PAGE ON AN ELECTRONIC DISPLAY DEVICE HAVING A LIMITED DISPLAY AREA

(75) Inventors: Regis Nicolas, Jacou (FR); Eric Lavigne, St-Aunes (FR); Alexis Martial, Clapiers (FR); Christophe Guiraud, Aigues-mortes (FR)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/574,746

(22) Filed: May 18, 2000

(51) Int. Cl.$^7$ .................................................. G09G 5/00
(52) U.S. Cl. ....................... 345/744; 345/853; 345/854; 345/855; 345/738; 345/746; 345/866
(58) Field of Search ................................. 345/853, 854, 345/855, 738, 744, 746, 838, 846, 864, 866

(56) References Cited

U.S. PATENT DOCUMENTS

| | | | | |
|---|---|---|---|---|
| 6,151,622 A | * | 11/2000 | Fraenkel et al. | 709/205 |
| 6,266,684 B1 | * | 7/2001 | Kraus et al. | 715/513 |
| 6,300,947 B1 | * | 10/2001 | Kanevsky | 345/866 |
| 6,430,624 B1 | * | 8/2002 | Jamtgaard et al. | 709/246 |
| 2002/0059244 A1 | * | 5/2002 | Bunney et al. | 707/10 |

\* cited by examiner

*Primary Examiner*—Ba Huynh
(74) *Attorney, Agent, or Firm*—Wagner, Murabito & Hao LLP

(57) ABSTRACT

A method and electronic system for viewing a Web page on a small-sized electronic display device. The small-sized electronic display device is coupled to an electronic system, e.g., a palmtop computer system includes the small-sized electronic display device. The present invention includes a method of individually displaying each frame of a Web page on a small-sized electronic display device such that a user utilizing the small-sized electronic display device can conveniently view and navigate Web pages. A user requests to view a particular Web page and an HTML file corresponding to the particular Web page is retrieved. If the Web page includes a plurality of frames, frame layout information is extracted from the HTML file. The frame layout information is used to generate a frame representation, wherein the frame representation includes a plurality of geometric frame identifiers. Each geometric frame identifier corresponds to one of the plurality of frames. In one embodiment, the frame representation is a Web page. The frame representation is displayed. In one embodiment, a user selects the geometric frame identifier which corresponds to the frame the user desires to view on the small-sized electronic display device. In a second embodiment, a plurality of frame criteria is applied to each frame to automatically select a frame. Once the geometric frame identifier corresponding to the desired frame is selected, an HTML file associated with the desired frame is retrieved, read, and displayed on the small-sized electronic display device.

27 Claims, 15 Drawing Sheets

51

1900

DISPLAYING A WEB PAGE ON AN ELECTRONIC DISPLAY DEVICE HAVING A LIMITED DISPLAY AREA

BACKGROUND OF THE INVENTION

1. Field of the Invention

The present invention generally relates to the field of accessing information via a network. More particularly, the present invention relates to the field of browsing the Internet with an electronic display device having a limited display area.

2. Related Art

Computers and other electronic devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these stand-alone devices together in order to form a networking environment. Within a networking environment, users may readily exchange files, share information stored on a common database, pool resources, and communicate via electronic mail (e-mail) and via video teleconferencing. Furthermore, computers or other types of electronic devices which are coupled to the Internet provide their users access to data and information from all over the world.

A personal digital assistant (commonly referred to as a PDA) is a palmtop computer system. It is appreciated that the personal digital assistant is a portable hand-held device that is used as an electronic organizer which has the capability to store a wide range of information that includes daily appointments, numerous telephone numbers of business and personal acquaintances, and various other information. Moreover, the personal digital assistant can also access information from the Internet, as mentioned above. In particular, the personal digital assistant can browse Web pages located on the Internet. Typically, the personal digital assistant includes an electronic display device having a display area (e.g., a screen) that is smaller in size relative to a display area associated with a standard-sized electronic display device (e.g., 15 inch monitor, 17 inch monitor, etc.) which is part of a desktop computer system or a laptop computer system. In addition, other small-sized electronic display devices which are coupled to other electronic systems or electronic devices such as cellular phones, pagers, and other hand-held electronic devices, are also capable of browsing Web pages located on the Internet. It should be appreciated that there are disadvantages associated with displaying Web pages from the Internet on the electronic display device having a small display area relative to the standard-sized electronic display device.

A typical Web page on the Internet is coded in Hypertext Markup Language (HTML) and configured with sufficient content (e.g., text, graphics, multi-media, etc.) to occupy the entire screen of the standard-sized electronic display device when the typical Web page is displayed. The typical Web page is accessed and read via a Web browser such as Netscape Navigator or Microsoft Internet Explorer. Moreover, the typical Web page is formatted into several frames by a parent Web page, whereas each frame is a separate Web page from the rest of the parent Web page.

Unfortunately, a user utilizing the electronic display device which is coupled to a hand-held electronic device to browse the Internet experiences difficulty in viewing and navigating Web pages because the user is unable to see as much of the Web page content as possible with the standard-sized electronic display device. Moreover, a user of some wireless Internet connection services gets charged for the information sent to the user via the wireless Internet connection. Thus, sending an entire Web page at once via the wireless Internet connection is expensive to the user. In general, the user has several deficient options for browsing the Internet on a small-sized electronic display device. All of these deficient options reduce the Web browsing experience from the user's perspective.

A first option entails displaying only the text content of the Web page. The first option prevents the user from enjoying a substantial portion of the Web pages on the Internet since a substantial portion of the Web pages are designed and oriented with a considerable amount of graphics content. A second option entails reducing the scale size of the Web page prior to displaying it on the small-sized electronic display device. Unfortunately, the user may not be able to see, to read, or to use comfortably the reduced-scale-size version of the Web page. Lastly, a third option entails designing Web pages with a markup programming language which is compatible with HTML and is configured for displaying Web pages on the small-sized electronic display device. The third option requires the duplication of Web content of Web pages in multiple markup programming languages, such duplication can be time consuming and costly.

SUMMARY OF THE INVENTION

Accordingly, what is needed is a method and electronic system for viewing a Web page on a small-sized electronic display device. Moreover, what is needed is a method of individually displaying each frame of a Web page on a small-sized electronic display device such that a user utilizing the small-sized electronic display device can conveniently view and navigate Web pages. Additionally, what is needed is a method of allowing a user utilizing a small-sized electronic display device to select a particular frame of a Web page to display while other frames of the Web page remain undisplayed.

A method and electronic system are described for viewing a Web page on a small-sized electronic display device. In practice, the small-sized electronic display device is coupled to an electronic system. In one embodiment, a palmtop computer system includes the small-sized electronic display device. Moreover, the present invention includes a method of individually displaying each frame of a Web page on a small-sized electronic display device such that a user utilizing the small-sized electronic display device can conveniently view and navigate Web pages.

These and other advantages of the present invention will no doubt become apparent to those of ordinary skill in the art after having read the following detailed description of the preferred embodiments which are illustrated in the drawing figures.

According to the present invention, a user requests to view a particular Web page. An HTML file corresponding to the particular Web page is retrieved. If the Web page includes a plurality of frames, frame layout information is extracted from the HTML file. The frame layout information is used to generate a frame representation, wherein the frame representation includes a plurality of geometric frame identifiers. Each geometric frame identifier corresponds to one of the plurality of frames. In one embodiment, the frame representation is a Web page. The frame representation is displayed. In one embodiment, a user selects the geometric frame identifier which corresponds to the frame the user desires to view on the small-sized electronic display device. In a second embodiment, a plurality of frame criteria is applied to each frame to automatically select a frame. Once the geometric frame identifier corresponding to the desired frame is selected (manually or automatically), an HTML file associated with the desired frame is retrieved, read, and displayed on the small-sized electronic display device. Hence, the present invention facilitates practical Web browsing on the small-sized electronic display device.

In one embodiment, the present invention includes a method of displaying content of a multi-frame Web page having a plurality of frames on an electronic display device, said method comprising the steps of: a) generating a frame representation for indicating a frame layout associated with said multi-frame Web page, wherein said frame representation includes a plurality of geometric frame identifiers each corresponding to a corresponding frame of said plurality of frames, each geometric frame identifier being configured for individual selection thereof; and b) displaying said frame representation on said electronic display device; and c) displaying a selected frame corresponding to a selected geometric frame identifier in response to said selected geometric frame identifier being selected.

In another embodiment, the present invention includes a method of viewing a multi-frame Web page having a plurality of frames on an electronic display device, said method comprising the steps of: a) determining a frame layout associated with said multi-frame Web page; b) generating a frame representation for indicating said frame layout, wherein said frame representation includes a plurality of geometric frame identifiers each corresponding to a corresponding frame of said plurality of frames, each geometric frame identifier being configured for individual selection by a user; c) displaying said frame representation on said electronic display device such that said user can select anyone of said plurality of geometric frame identifiers to view a corresponding one of said plurality of frames; and d) displaying on said electronic display device a selected frame corresponding to a selected geometric frame identifier in response to said user selecting said selected geometric frame identifier.

In still another embodiment, the present invention includes an electronic system comprising: a processor coupled to a bus; an electronic display device coupled to said bus; a computer-readable medium coupled to said bus and having computer-executable instructions for performing a method of displaying content of a multi-frame Web page having a plurality of frames on said electronic display device, said method comprising the steps of: a) generating a frame representation for indicating a frame layout associated with said multi-frame Web page, wherein said frame representation includes a plurality of geometric frame identifiers each corresponding to a corresponding frame of said plurality of frames, each geometric frame identifier being configured for individual selection thereof; and b) displaying said frame representation on said electronic display device; and c) displaying a selected frame corresponding to a selected geometric frame identifier in response to said selected geometric frame identifier being selected.

BRIEF DESCRIPTION OF THE DRAWINGS

The accompanying drawings, which are incorporated in and form a part of this specification, illustrate embodiments of the invention and, together with the description, serve to explain the principles of the present invention.

Figure 1A:
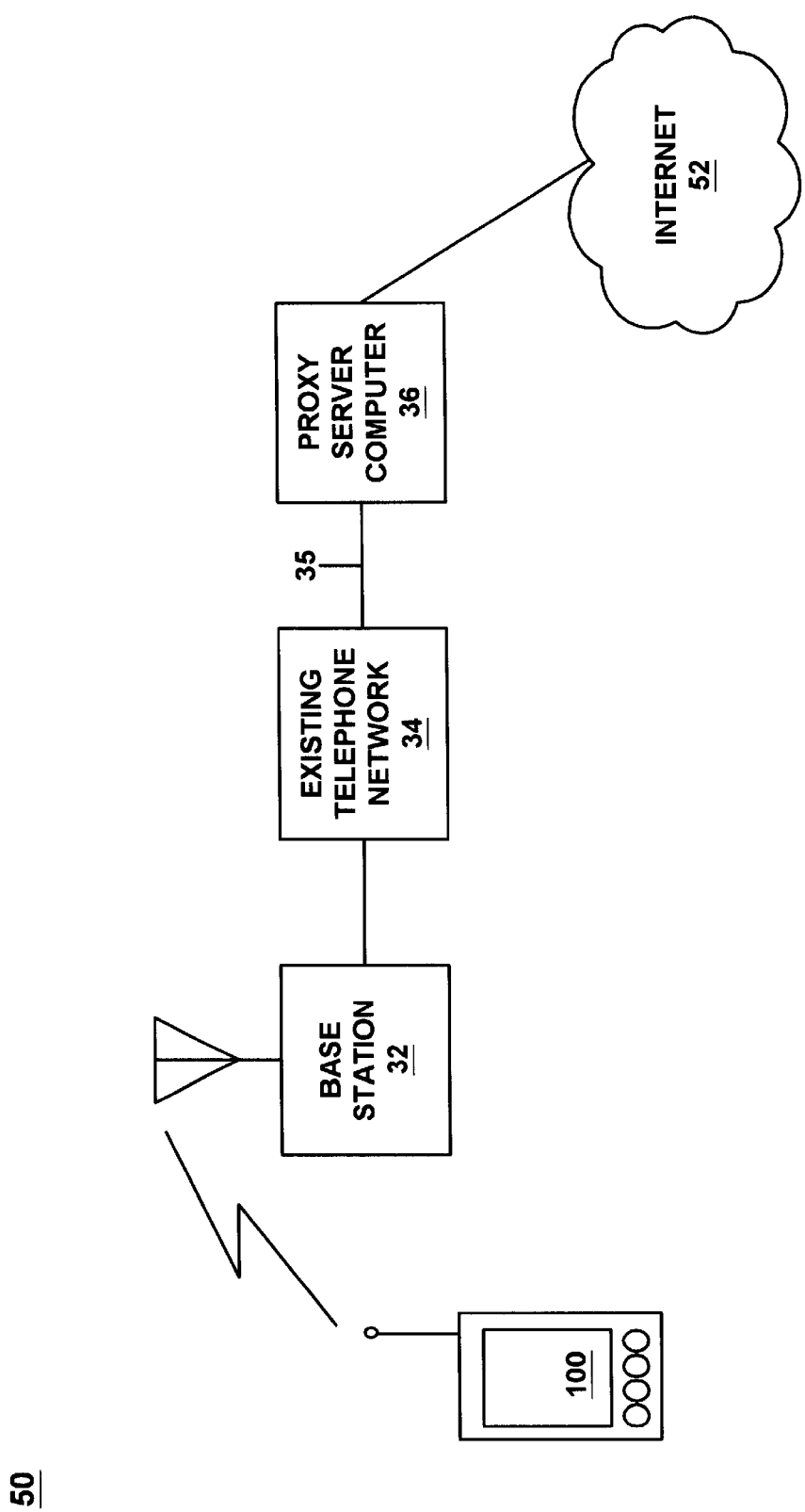
FIG. 1A illustrates a block diagram of a first exemplary network environment including a personal digital assistant in accordance with an embodiment of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a selfconsistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "canceling", "assigning", "receiving", "forwarding", "dumping", "updating", "bypassing", "transmitting", "determining", "retrieving", "displaying", "identifying", "modifying", "processing", "preventing", "using" or the like, refer to the actions and processes of an electronic system or a computer system, or other electronic computing device/system such as a personal digital assistant (PDA), a cellular phone, a pager, etc. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Electronic System Environment

One of the common types of electronic systems which can be used in accordance with one embodiment of the present invention is referred to as a personal digital assistant, or commonly called a PDA. The personal digital assistant is a pocket sized electronic organizer with the capability to store telephone numbers, addresses, daily appointments, and software that keeps track of business or personal data such as expenses, etc. Furthermore, the personal digital assistant also has the ability to connect to a personal computer, enabling the two devices to exchange updated information. Additionally, the personal digital assistant can also be connected to a modem, enabling it to have electronic mail (e-mail) capabilities over the Internet along with other Internet capabilities. Moreover, an advanced personal digital assistant can have Internet capabilities over a wireless communication interface (e.g., radio interface). In particular, the personal digital assistant can be used to browse Web pages located on the Internet. The present invention can be practiced with a personal digital assistant which is communicatively coupled to a networking environment. It should be appreciated that embodiments of the present invention are well suited to operate within a wide variety of electronic systems (e.g., computer systems) which can be communicatively coupled to a networking environment, including cellular phones, pagers, etc.

FIG. 1A is a block diagram of an exemplary network environment 50 including an exemplary portable electronic system 100 (e.g., a personal digital assistant). The personal digital assistant 100 is also known as a palmtop or palm-sized electronic system or computer system. The personal digital assistant 100 has the ability to transmit and receive data and information over a wireless communication interface (e.g., a radio interface). The personal digital assistant 100 is one exemplary implementation on which the present invention can operate. The present invention can operate on any portable electronic system/device having an electronic display device.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the personal digital assistant 100 to communicate with the Internet 52. It should be appreciated that within the present embodiment, one of the functions of proxy server 36 is to perform operations over the Internet 52 on behalf of the personal digital assistant 100. For example, proxy server 36 has a particular Internet address and acts as a proxy device for the personal digital assistant 100 over the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the personal digital assistant 100 and base station 32. It should be appreciated that one embodiment of a wireless communication system in accordance with the present invention is the Mobitex wireless communication system.

Figure 1B:
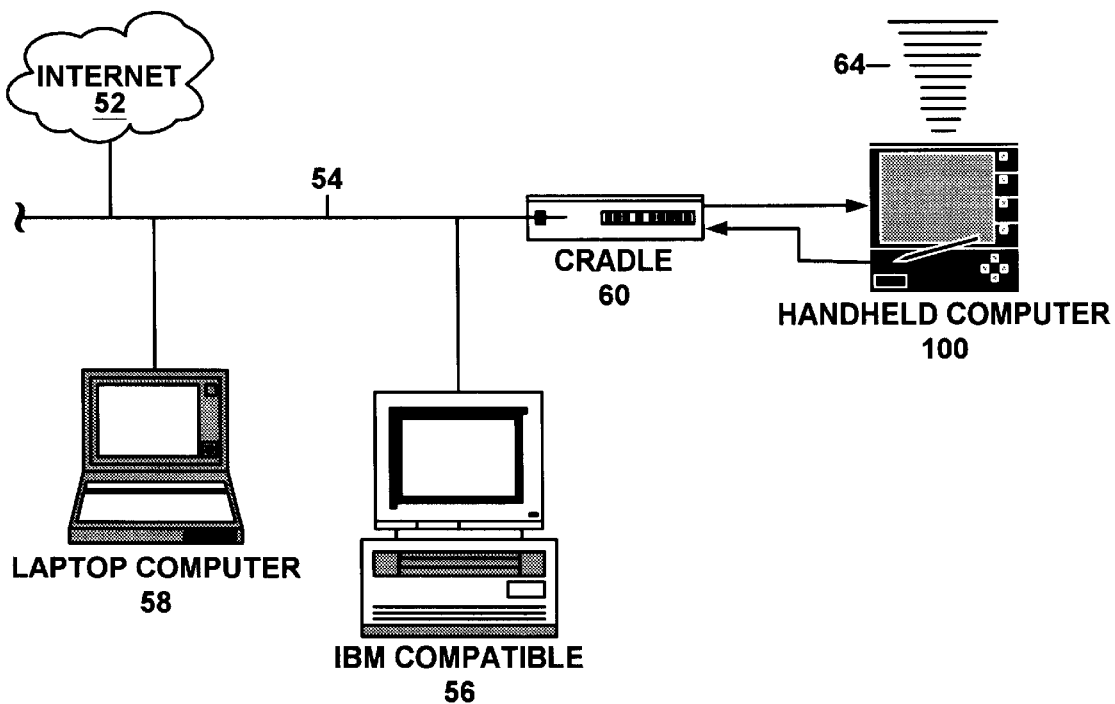
FIG. 1B illustrates a block diagram of a second exemplary network environment including a personal digital assistant coupled to other computer systems and the Internet via a cradle device in accordance with an embodiment of the present invention.

FIG. 1B illustrates another embodiment of a system 51 that can be used in conjunction with various embodiments of the present invention. System 51 comprises a host computer system 56 which can either be a desktop computer system as shown, or, alternatively, can be a laptop computer system 58. Optionally, more than one host computer system 56 can be used within system 51. Host computer systems 58 and 56 are shown connected to a communication bus 54, which in one embodiment can be a serial communication bus, but could be of any of a number of well known designs (e.g., a parallel bus, Ethernet Local Area Network (LAN), etc.). Optionally, bus 54 can provide communication with the Internet 52 using a number of well known protocols.

Importantly, bus 54 is also coupled to a cradle 60 for receiving and initiating communication with the personal digital assistant 100 of the present invention. Cradle 60 provides an electrical and mechanical communication interface between bus 54 (and any device coupled to bus 54) and the personal digital assistant 100 for two-way communications. The personal digital assistant 100 also contains a wireless infrared communication mechanism 64 for sending and receiving information from other devices.

With reference to both FIGS. 1A and 1B, it is appreciated that the personal digital assistant 100 can be used in a network environment combining elements of networks 50 and 51. That is, as will be seen below, the personal digital assistant 100 can include both a wireless infrared communication mechanism and a signal (e.g., radio) receiver/transmitter device.

Figure 2:
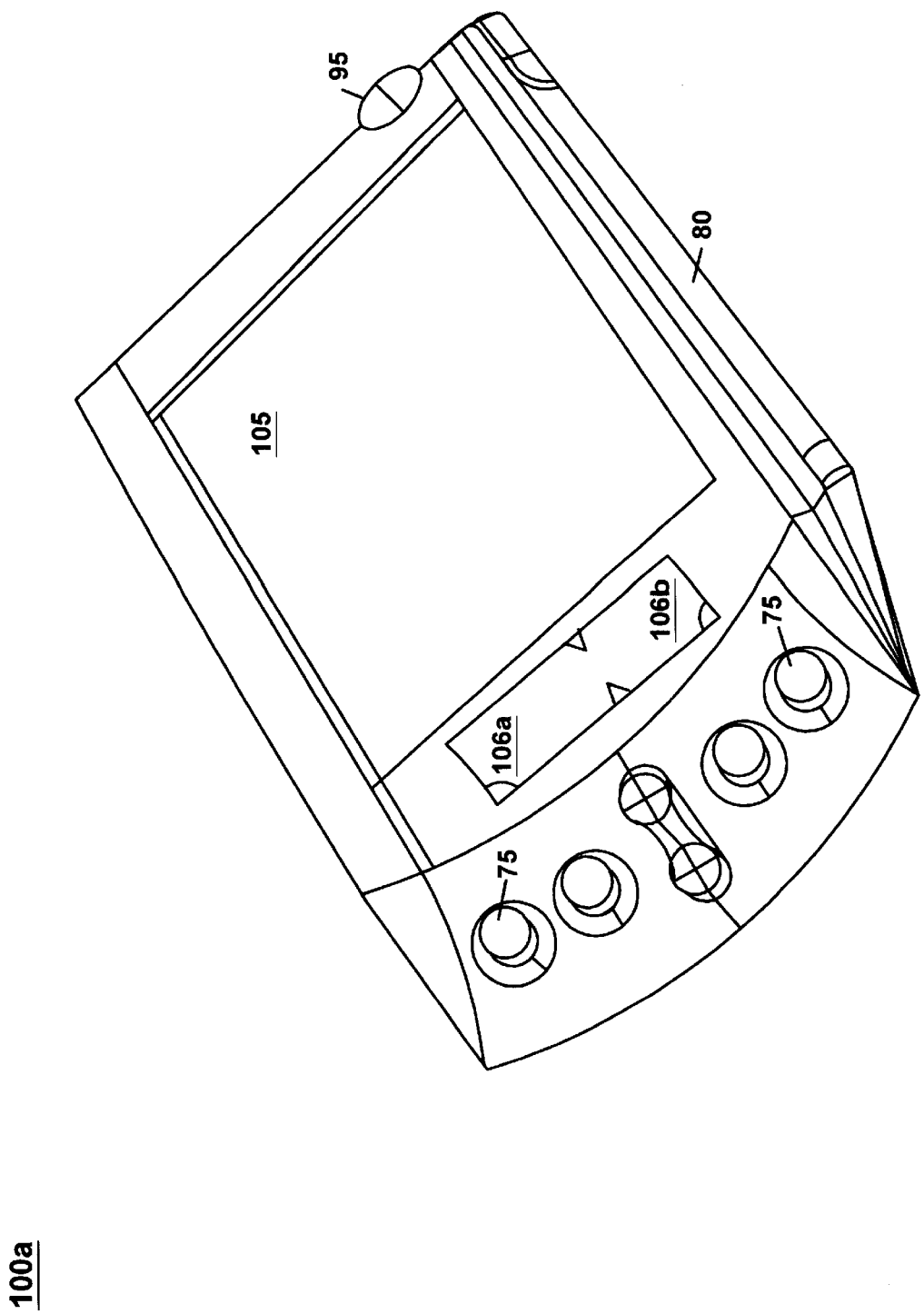
FIG. 2 illustrates a top side perspective view of a personal digital assistant that can be used as a platform for displaying Web pages in accordance with an embodiment of the present invention.

FIG. 2 is a perspective illustration of the top face 100a of one embodiment of the exemplary personal digital assistant or palmtop computer system 100. The top face 100a has a display screen 105 surrounded by a bezel or cover. A removable stylus 80 is also shown. The display screen 105 is a touch screen able to register contact between the screen and the tip of the stylus 80. The stylus 80 can be of any material to make contact with the display screen 105. The top face 100a also has one or more dedicated and/or programmable buttons 75 for selecting information and causing the computer system to implement functions. The on/off button 95 is also shown. Moreover, a user is able to control specific functionality of the personal digital assistant 100 by using its plurality of buttons 75 (e.g., to invoke telephone/address data, calendar data, to-do-list data, memo pad data, etc.). Furthermore, the user can utilize the stylus 80 in conjunction with the display screen 105 in order to cause the personal digital assistant 100 to perform a multitude of different functions. One such function is the selecting of different functional operations of the personal digital assistant 100, which are accomplished by touching stylus 80 to specific areas of display screen 105. Another such function is the entering of data into the personal digital assistant 100.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
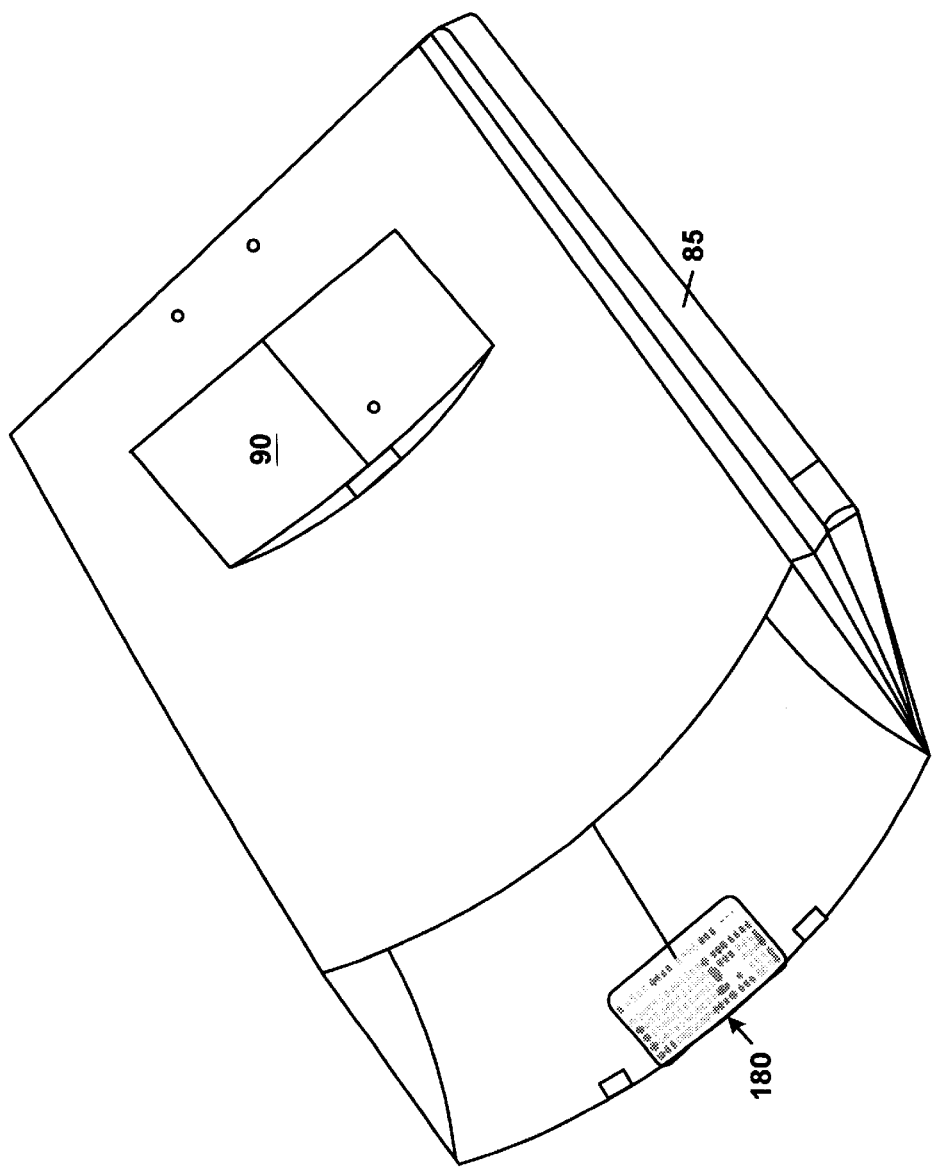
FIG. 3 illustrates a bottom side perspective view of the personal digital assistant of FIG. 2.

FIG. 3 illustrates the bottom side 100b of one embodiment of the exemplary personal digital assistant or palmtop computer system 100 that can be used in accordance with various embodiments of the present invention. An extendible antenna 85 is shown, and also a battery storage compartment door 90 is shown. The antenna 85 enables the personal digital assistant 100 to be communicatively coupled to a network environment (as shown in FIG. 1A) thereby enabling a user to communicate information with other electronic systems and electronic devices coupled to the network. A communication interface 180 is also shown. In one embodiment of the present invention, the communication interface 180 is a serial communication port, but could also alternatively be of any of a number of well-known communication standards and protocols (e.g., parallel, SCSI (small computer system interface), Firewire (IEEE 1394), Ethernet, etc.).

Figure 4:
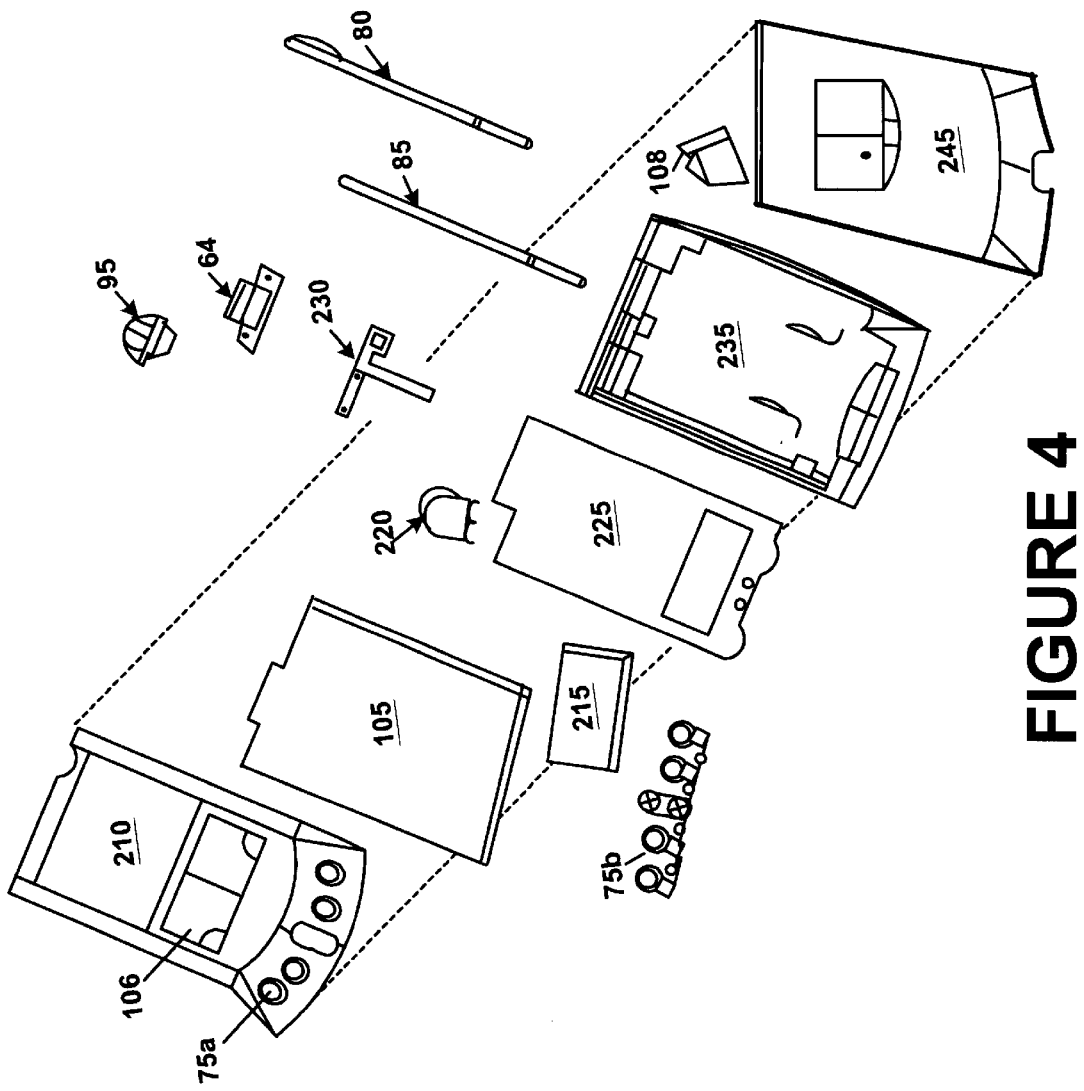
FIG. 4 illustrates an exploded view of the components of the personal digital assistant of FIG. 2.

FIG. 4 is an exploded view of the exemplary personal digital assistant 100. The personal digital assistant 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a personal computer (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between the personal digital assistant 100 and other networked computers and/or the Internet via a proxy server (see FIG. 1A).

Figure 5:
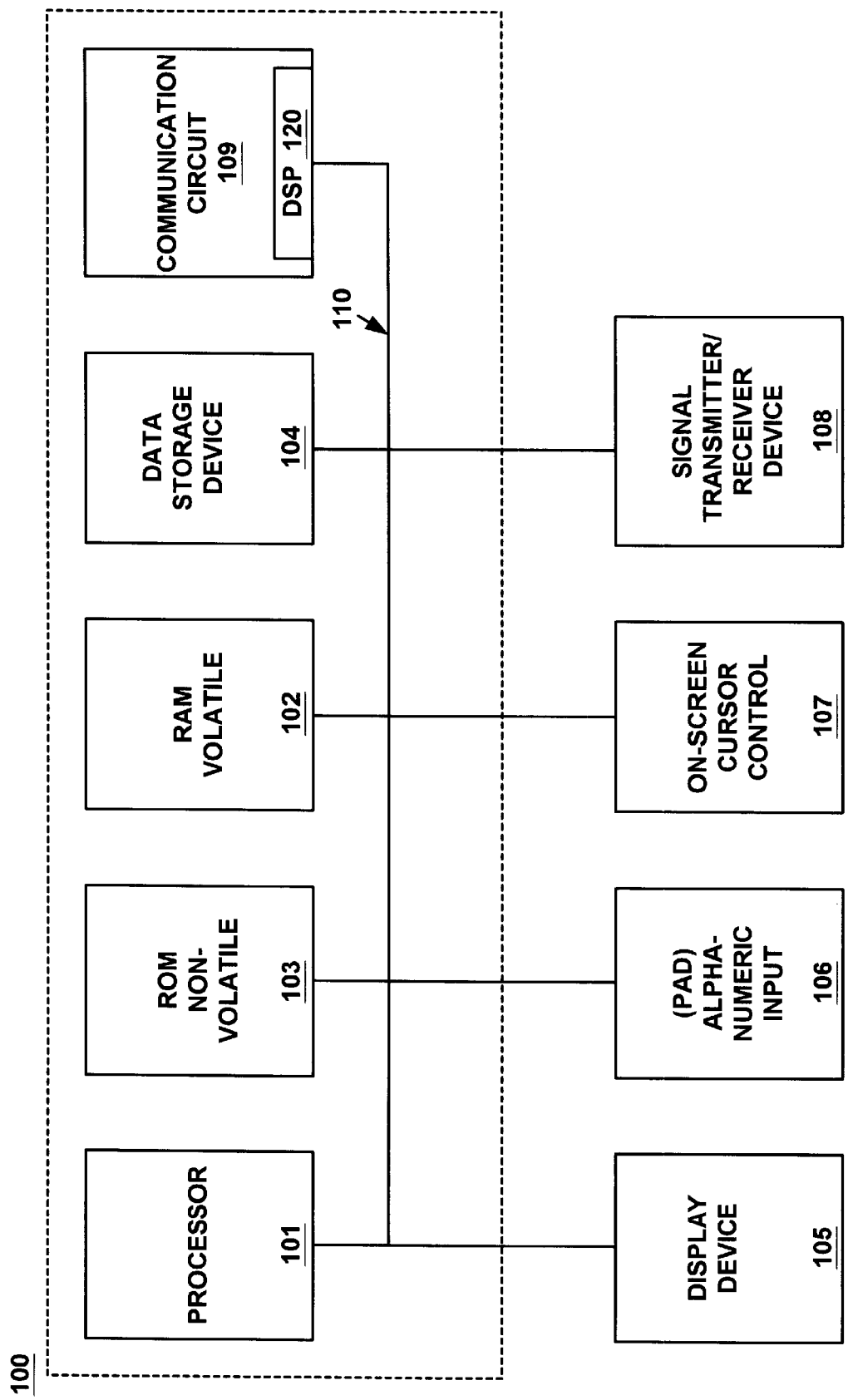
FIG. 5 illustrates is a logical circuit block diagram of the personal digital assistant in accordance with an embodiment of the present invention.

Referring now to FIG. 5, portions of the present method and electronic system are comprised of computer-readable and computer-executable instructions which reside, for example, in computer-readable media of an electronic system (e.g., personal digital assistant, computer system, and the like). FIG. 5 is a block diagram of exemplary interior components of the personal digital assistant 100 upon which embodiments of the present invention may be implemented. It is appreciated that the personal digital assistant 100 of FIG. 5 is only exemplary and that the present invention can operate within a number of different electronic systems including general purpose networked computer systems, embedded computer systems, and stand alone electronic systems such as a cellular telephone or a pager.

FIG. 5 illustrates circuitry of an electronic system or computer system 100 (such as the personal digital assistant), some of which can be implemented on PC board 225 (FIG. 4). Computer system 100 includes an address/data bus 110 for communicating information, a central processor 101 coupled to the bus 110 for processing information and instructions, a volatile memory 102 (e.g., random access memory, static RAM, dynamic RAM, etc.) coupled to the bus 110 for storing information and instructions for the central processor 101 and a non-volatile memory 103 (e.g., read only memory, programmable ROM, flash memory, EPROM, EEPROM, etc.) coupled to the bus 110 for storing static information and instructions for the processor 101. Computer system 100 also includes an optional data storage device 104 (e.g., memory card, hard drive, etc.) coupled with the bus 110 for storing information and instructions. Data storage device 104 can be removable. As described above, computer system 100 also includes an electronic display device 105 coupled to the bus 110 for displaying information to the computer user. In one embodiment, PC board 225 can include the processor 101, the bus 110, the ROM 103 and the RAM 102.

With reference still to FIG. 5, computer system 100 also includes a signal transmitter/receiver device 108 which is coupled to bus 110 for providing a communication link between computer system 100 and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well-suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, some or all of the functions performed by DSP 120 can be performed by processor 101.

Also included in computer system 100 of FIG. 5 is an optional alphanumeric input device 106 which in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, onscreen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6:
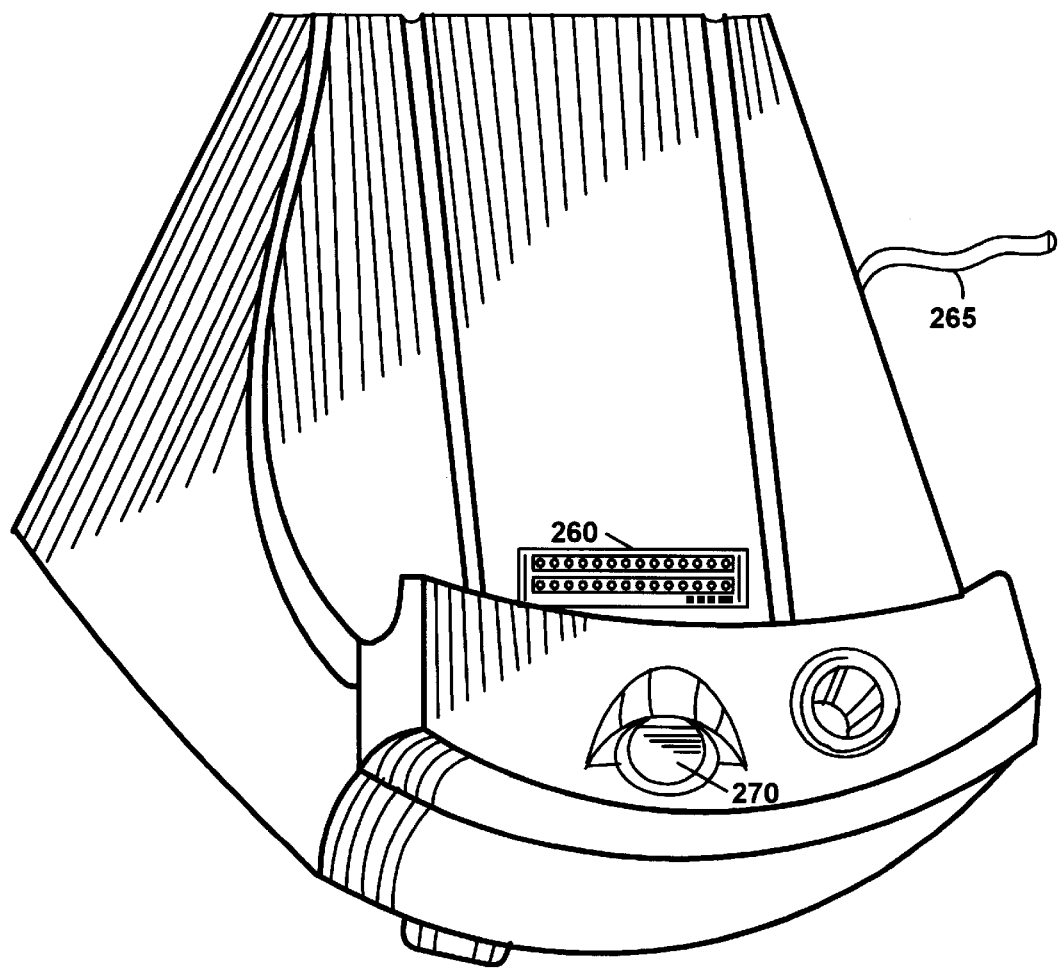
FIG. 6 illustrates a perspective view of the cradle device for connecting the personal digital assistant to other systems via a communication interface.

FIG. 6 is a perspective illustration of one embodiment of the cradle 60 for receiving the personal digital assistant or palmtop computer system 100. Cradle 60 includes a mechanical and electrical interface 260 for interfacing with communication interface 108 (FIG. 3) of the personal digital assistant 100 when the personal digital assistant 100 is slid into the cradle 60 in an upright position. Once inserted, button 270 can be pressed to initiate two-way communication between the personal digital assistant 100 and other computer systems or electronic devices coupled to serial communication 265.

Viewing Web Pages on a Small-Sized Electronic Display Device

Although the description of the present invention will focus on a small-sized electronic display device which is coupled to an exemplary personal digital assistant or palmtop computer system, the present invention can be practiced in conjunction with other small-sized electronic display devices which are coupled to other portable electronic systems or electronic devices (e.g., cellular phones, pagers, etc.).

The present invention can be practiced with the Web clipping invention disclosed in the patent application entitled "Method and Apparatus for Communicating Information Over Low Bandwidth Communications Network, Ser. No. 09/087,515, filed on May 29, 1998, by inventors Jeffrey C. Hawkins, Joseph K. Sipher, and Scott D. Lincke, and assigned to the assignee of the present invention. The patent application "Method and Apparatus for Communicating Information Over Low Bandwidth Communications Network, Ser. No. 09/087,515, is incorporated herein by reference.

As discussed above, a small-sized electronic display device refers in one embodiment to an electronic display device having a display area (e.g., a screen) that is smaller in size relative to a display area associated with a standard-sized electronic display device (e.g., 15 inch monitor, 17 inch monitor, etc.) which is coupled to a desktop computer system or a laptop computer system.

Hypertext Markup Language (HTML) is the basic programming language for coding the plurality of hypertext documents (e.g., Web pages) published on the World Wide Web (WWW) environment of the Internet. Each Web page comprises an HTML file residing or stored on Hypertext Transfer Protocol (HTTP) servers distributed throughout the Internet. The HTML file is retrieved by a Web browser and provides instructions to a Web browser in regard to the content of the Web page and the manner of displaying the Web page on the electronic display device. Moreover, each Web page is identified by a Uniform Resource Locator (URL) which specifies the particular HTTP server and pathname by which the HTML file associated with the Web page can be accessed. Specifically, the URL contains data the Web browser can use to request a set of servers called Domain Name System (DNS) servers to map the URL to the IP address of the particular HTTP server. Typically, the HTML file references one or more associated files which may store graphics, scripts, audio data, or any other type of data, whereas the associated files are retrieved along with the HTML file for rendering the Web page on the electronic display device.

The HTML file comprises a plurality of HTML features which are processed by the Web browser. The HTML features are indicated by special codes, called tags. If there was an HTML tag called YYYY, then the characters <YYYY> would mark the beginning of this feature, and the characters </YYYY> would mark the end of this HTML feature. For example, in the HTML file the keywords <body> and </body> mark the beginning and end of the actual content of the Web page. Moreover, tags can be used to mark elements, such as text or graphics, in a Web page to indicate how a Web browser should respond to a user's actions, such as activation of a hypertext link by means of a mouse click or a key press on the keyboard.

As described above, a popular HTML feature is a frame. Frames enable advanced Web navigation possibilities by dividing a Web page into multiple sections. Each section is referred as a frame. Each frame on a Web page is a separate Web page. Each frame comprises a separate HTML file. Associated with each frame are the same capabilities as for a Web page, including scrolling and linking to another frame or Web page. These capabilities can be used independently of other frames on the Web page. Moreover, a frame can contain one or more frames. Typically, a Web page formatted into frames has an HTML file which includes the keywords <frameset> and </frameset> to mark the beginning and the end of specific code defining the frame layout of the Web page. Additionally, the keywords <frame> and </frame> mark the beginning and the end of specific code defining a plurality of frame attributes for each frame on the Web page, whereas the keywords <frame> and </frame> are inserted between the keywords <frameset> and </frameset>. For example, the HTML code:

<HTML>
   <frameset rows="100%, *" cols="50%, 50%">
   <frame src="navbar.html" name="NavigationBar" scrolling=auto> </frame>
   <frame src="main.html" name="Main" scrolling=auto> </frame>
   </frameset>
   </HTML> divides a Web page into two columns (or frames) of equal dimensions. One frame is defined by the HTML file "navbar.html" and is named "NavigationBar" while the other frame is defined by the HTML file "main.html" and is named "Main". The HTML tags have not been standardized yet. However, an effort led by the World Wide Web Consortium is attempting to standardize HTML tags.

On the standard-sized electronic display device, all the frames of a Web page can be displayed for conveniently viewing by a user. However, the small-sized electronic display device of the personal digital assistant does not have sufficient display area to view all the frames of a web page at once when a user is Web browsing. The present invention overcomes this limitation (1) by generating a frame representation which indicates the frame layout of the Web page and (2) by displaying one frame at a time on the small-sized electronic display device, whereas either a user selects the frame to be displayed or the frame to be displayed is automatically selected based on a plurality of frame criteria. The present invention can be practiced with Web pages coded in HTML, Web pages coded in an HTML-compatible language, Web pages coded with the equivalent of "frames" as described in this disclosure of the present invention, or Web pages coded with any information displaying language (e.g., WAP, Web Clipping, etc.).

Figure 7:
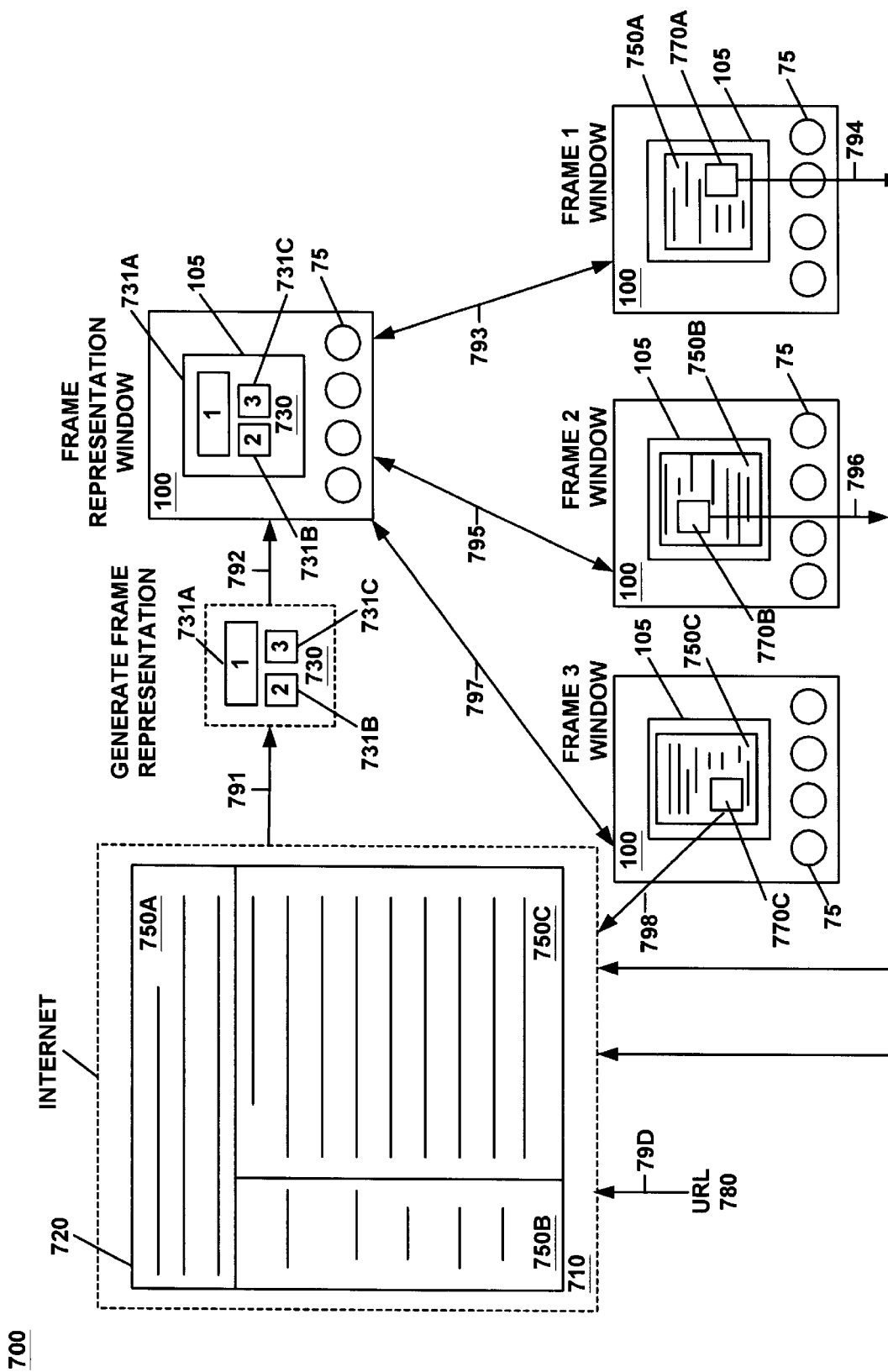
FIG. 7 illustrates a block diagram of a procedure for displaying a Web page on the personal digital assistant in accordance with an embodiment of the present invention.

FIG. 7 illustrates a block diagram of a procedure 700 for displaying a Web page on a personal digital assistant 100 in accordance with an embodiment of the present invention. A user can use the personal digital assistant 100 to browse and to view Web pages while the personal digital assistant 100 is coupled to a network environment as described above. In one embodiment, the user is able to browse the Internet by invoking an application (e.g., a Web browser) specifically designed to implement the present invention. In another embodiment, the user is able to browse the Internet by invoking an application (e.g., a Web browser) having a plug-in module for implementing the present invention.

In accordance with the present invention, a Web browsing session is initiated by the user who provides a URL 780 associated with a desired Web page 720 which the user requests to view on the small-sized electronic display device 105 coupled to the personal digital assistant 100, whereas the URL 780 is provided to the application (e.g., Web browser) which is configured to execute the present invention and which is operating on the personal digital assistant 100. The user can provide the URL 780 by inputting the URL 780, pressing a specific key (on a keyboard, a keypad, or a set of function keys 75) which is associated with the URL 780, clicking a mouse while a cursor is positioned over a hyperlink element associated with the URL 780, pointing at a hyperlink element associated with the URL 780 (on the small-sized electronic display device) with a stylus or pen, or in any other appropriate manner.

The arrow 790 indicates that the URL 780 is utilized to locate and to retrieve the desired Web page 720 from the Internet 710 via a network environment described above. In particular, an HTML file associated with the desired Web page 720 is retrieved from the Internet 710 as indicated by the arrow 791.

Rather than opening and reading the HTML file and displaying the Web page on the small-sized electronic display device 105, the application of the present invention examines the HTML file and determines whether the HTML file includes code for defining a frame layout for the desired Web page 720. If the HTML file does include code for defining a frame layout for the desired Web page 720, the application continues processing the HTML file according to the operations of the present invention, including generating a frame representation 730 as discussed below. If the HTML file does not include code for defining a frame layout for the desired Web page 720, the application may attempt display the desired Web page 720 as discussed above in connection with the first option, the second option, and the third option or may simply not display the desired Web page 720 on the small-sized electronic display device 105. In one embodiment, the application looks for the tag keywords <frameset> and </frameset> in the HTML file to determine whether the desired Web page 720 includes a frame layout.

For exemplary purposes, the desired Web page 720 is shown as having a frame layout, which is defined in the HTML file, having a first frame 750A, a second frame 750B, and a third frame 750C. It should be recognized by a person of ordinary skill in the art that the desired Web page 720 can include any number of frames in the frame layout.

As shown in FIG. 7, an examination of the HTML file reveals that the desired Web page 720 includes a frame layout having a first frame 750A, a second frame 750B, and a third frame 750C. Thereafter, the application generates a frame representation 730. The frame representation 730 is designed for indicating a frame layout associated with the desired Web page 720. Moreover, the frame representation 730 is displayed on the small-sized electronic display device 105, providing the user a description of the frame layout of the desired Web page 720. In one embodiment, the frame representation 730 is a Web page, having the same capabilities as a typical Web page, including scrolling and linking to another Web page.

The frame representation 730 includes a plurality of geometric frame identifiers 731A–731C. Each geometric frame identifier can be individually selected, for example, by a user or by the application. Each geometric frame identifier corresponds to one of the plurality of frames. For example, the geometric frame identifier 731A corresponds to the first frame 750A. The geometric frame identifier 731B corresponds to the second frame 750B. The geometric frame identifier 731C corresponds to the third frame 750C. In one embodiment, the shape, size, and positioning of the geometric frame identifiers 731A–731C are based on the size, shape, and positioning of the corresponding frame, including the content of the corresponding frame. It should be recognized by a person of ordinary skill in the art that the geometric frame identifiers 731A–731C can have any shape, size, and position.

Figure 8:
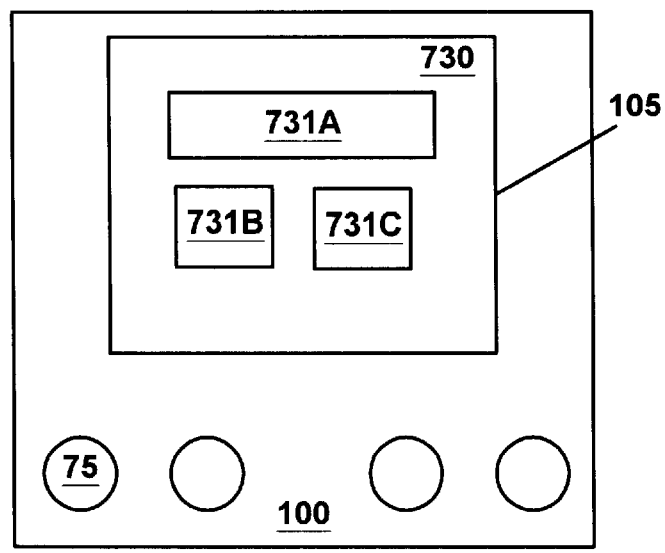
FIG. 8 illustrates a frame representation which is displayed on a small-sized electronic display device coupled to the personal digital assistant in accordance with an embodiment of the present invention.

FIG. 8 illustrates a frame representation 730 which is displayed on a smallsized electronic display device 105 coupled to the personal digital assistant 100 in accordance with an embodiment of the present invention. It should be recognized by a person of ordinary skill in the art that the geometric frame identifiers 731A–731C can have a shape other than rectangular (e.g., circular, triangular, trapezoidal, linear, etc.). In addition, the shape, positioning, and visual display properties of the geometric frame identifiers 731A–731C can be based on the content of the desired Web page 720. Moreover, the frame representation 730 provides the user a more useful visual depiction of the desired Web page 720 than previously possible. Additionally, the frame representation 730 can include content which is not part of the frame layout of the desired Web page 720 but is part of the desired Web page 720.

Referring to FIG. 7, in one embodiment, the geometric frame identifiers 731A–731C include a label. For example, the geometric frame identifier 731A has the label 1. The geometric frame identifier 731 B has the label 2. The geometric frame identifier 731C has the label 3. The labels assist the user in distinguishing the geometric frame identifiers 731A–731C. Moreover, the labels can provide a short description of the contents of the corresponding frame to help the user decide which geometric frame identifier to select in order to view the corresponding frame.

Figure 9A:
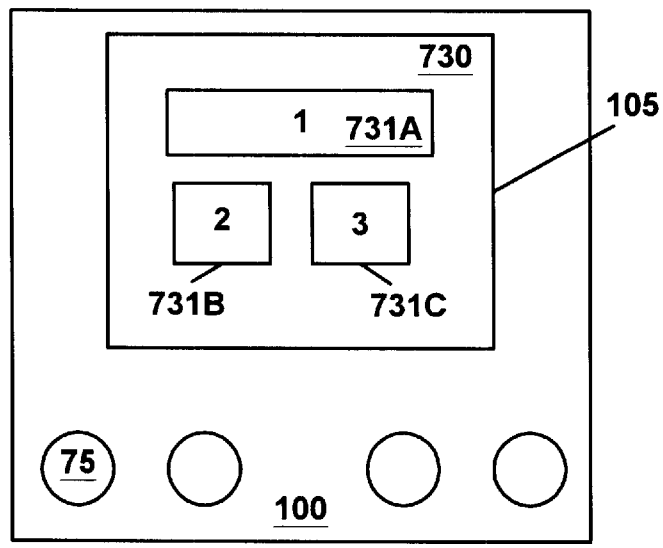
FIG. 9A illustrates a plurality of geometric frame identifiers in accordance with one embodiment of the present invention.

FIG. 9A illustrates a plurality of geometric frame identifiers in accordance with one embodiment of the present invention. As displayed on the small-sized electronic display device 105 coupled to the personal digital assistant 100, the geometric frame identifiers 731A–731C include a number as a label. The application provides a user interface to the user. Utilizing the user interface, the user can select a geometric frame identifier by inputting the label number corresponding to the geometric frame identifier, pressing a specific key (on a keyboard, a keypad, or a set of function keys 75) which is associated with the label number, clicking a mouse while a cursor is positioned over a specific geometric frame identifier, pointing at a specific geometric frame identifier (on the small-sized electronic display device) with a stylus or pen, or in any other appropriate manner.

Figure 9B:
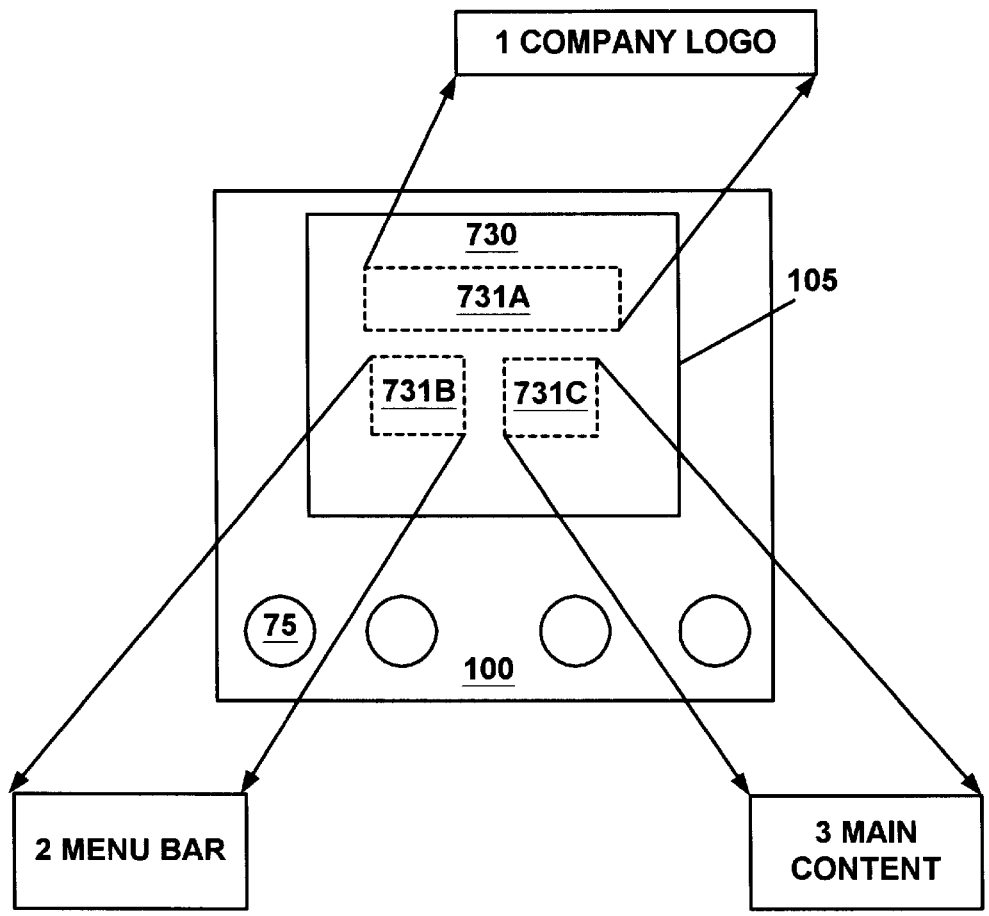
FIG. 9B illustrates a plurality of geometric frame identifiers in accordance with another embodiment of the present invention.

FIG. 9B illustrates a plurality of geometric frame identifiers in accordance with another embodiment of the present invention. As displayed on the small-sized electronic display device 105 coupled to the personal digital assistant 100, the geometric frame identifiers 731A–731C include a number and a brief description. The brief description can correspond to a name associated with the corresponding frame, whereas the name can be extracted from the HTML file of the desired Web page 720. Alternatively, the brief description can correspond to a portion of the content of the corresponding frame, whereas the content of the corresponding frame is found in an HTML file associated with the corresponding frame. In order to utilize a portion of the content, the portion of the content must be downloaded to the personal digital assistant 100, care must be taken to minimize the extent of the content downloaded to the personal digital assistant 100 to avoid downloading the entire Web page 720 prematurely. It should be recognized by a person of ordinary skill in the art that the labels can have other configurations, including implemented as a brief description without numbers.

Referring to FIG. 7, each geometric frame identifier is associated with a Uniform Resource Locator (URL) corresponding to the corresponding frame, whereas the URL corresponding to the corresponding frame indicates the location in the Internet 710 where an HTML file for the corresponding frame can be accessed and retrieved. Thus, the user can select a geometric frame identifier, causing the application to utilize the associated URL to retrieve the corresponding frame. The application provides a user interface to the user. Utilizing the user interface, the user can select a geometric frame identifier by inputting the label number corresponding to the geometric frame identifier, pressing a specific key (on a keyboard, a keypad, or a set of function keys 75) which is associated with the label number, clicking a mouse while a cursor is positioned over a specific geometric frame identifier, pointing at a specific geometric frame identifier (on the small-sized electronic display device) with a stylus or pen, or in any other appropriate manner.

Referring to FIG. 7, the arrow 792 indicates that the application displays the frame representation 730 on the small-sized electronic display device 105 coupled to the personal digital assistant 100. In one embodiment, the user views the frame representation 730 and selects a geometric frame identifier, causing the application to display the corresponding frame on the small-sized electronic display device 105 coupled to the personal digital assistant 100. In a second embodiment, the application automatically selects a geometric frame identifier by applying a plurality of frame criteria. The frame criteria can include, for example, selecting the frame with the largest dimensions, selecting the frame which includes frame content having particular keywords, selecting the frame having a particular name, or any other appropriate frame criteria. In order to utilize a portion of the content to select a particular frame, the portion of the content must be downloaded to the personal digital assistant 100, care must be taken to minimize the extent of the content downloaded to the personal digital assistant 100 to avoid downloading the entire Web page 720 prematurely. Moreover, the frame criteria can be specified by the user. Alternatively, the frame criteria can be preprogrammed into the application.

By displaying one frame of the desired Web page 720 rather than simultaneously displaying all the frames 750A–750C of the desired Web page 720, the user is presented with a usable visual depiction of the desired Web page 720. Moreover, the user can conveniently browse and navigate the Internet 710. Once a geometric frame identifier is selected, the corresponding frame is displayed on the small-sized electronic display device 105 coupled to the personal digital assistant 100. More frame content is visible than previously possible, enhancing the Web browsing experience for the user.

The arrow 793 indicates that geometric frame identifier 731A has been selected. Hence the application utilizes the associated URL to retrieve the corresponding frame (the first frame 750A). Specifically, an HTML file is accessed and retrieved from the Internet 710. The application renders the first frame 750A according to the instructions provided by the HTML file in regard to the content of the first frame 750A and the manner of displaying the first frame 750A on the small-sized electronic display device 105. Additionally, the arrow 793 indicates that the user can direct the application to display the frame representation 730 again on the small-sized electronic display device 105 so that the user can select another geometric frame identifier 731A–731C. In one embodiment, the user can once more view the frame representation 730 by selecting a particular object which is displayed on the small-sized electronic display device 105.

Additionally, the arrow 794 indicates that the user can select a hyperlink element 770A on the first frame 750A to link or jump to a second desired Web page. Thus, the application utilizes the URL of the second desired Web page to perform the operations discussed above in connection with the desired Web page 720.

The arrow 795 indicates that geometric frame identifier 731B has been selected. Hence the application utilizes the associated URL to retrieve the corresponding frame (the second frame 750B). Specifically, an HTML file is accessed and retrieved from the Internet 710. The application renders the first frame 750B according to the instructions provided by the HTML file in regard to the content of the second frame 750B and the manner of displaying the second frame 750B on the small-sized electronic display device 105. Additionally, the arrow 795 indicates that the user can direct the application to display the frame representation 730 again on the small-sized electronic display device 105 so that the user can select another geometric frame identifier 731A–731C. In one embodiment, the user can once more view the frame representation 730 by selecting a particular object which is displayed on the small-sized electronic display device 105.

Additionally, the arrow 796 indicates that the user can select a hyperlink element 770B on the second frame 750B to link or jump to a third desired Web page. Thus, the application utilizes the URL of the third desired Web page to perform the operations discussed above in connection with the desired Web page 720.

The arrow 797 indicates that geometric frame identifier 731C has been selected. Hence the application utilizes the associated URL to retrieve the corresponding frame (the third frame 750C). Specifically, an HTML file is accessed and retrieved from the Internet 710. The application renders the third frame 750C according to the instructions provided by the HTML file in regard to the content of the third frame 750C and the manner of displaying the third frame 750C on the small-sized electronic display device 105. Additionally, the arrow 797 indicates that the user can direct the application to display the frame representation 730 again on the small-sized electronic display device 105 so that the user can select another geometric frame identifier 731A–731C. In one embodiment, the user can once more view the frame representation 730 by selecting a particular object which is displayed on the small-sized electronic display device 105.

Additionally, the arrow 798 indicates that the user can select a hyperlink element 770C on the third frame 750C to link or jump to a fourth desired Web page. Thus, the application utilizes the URL of the fourth desired Web page to perform the operations discussed above in connection with the desired Web page 720.

User Selects Frame to View a Small-Sized Electronic Display Device

Figure 10:
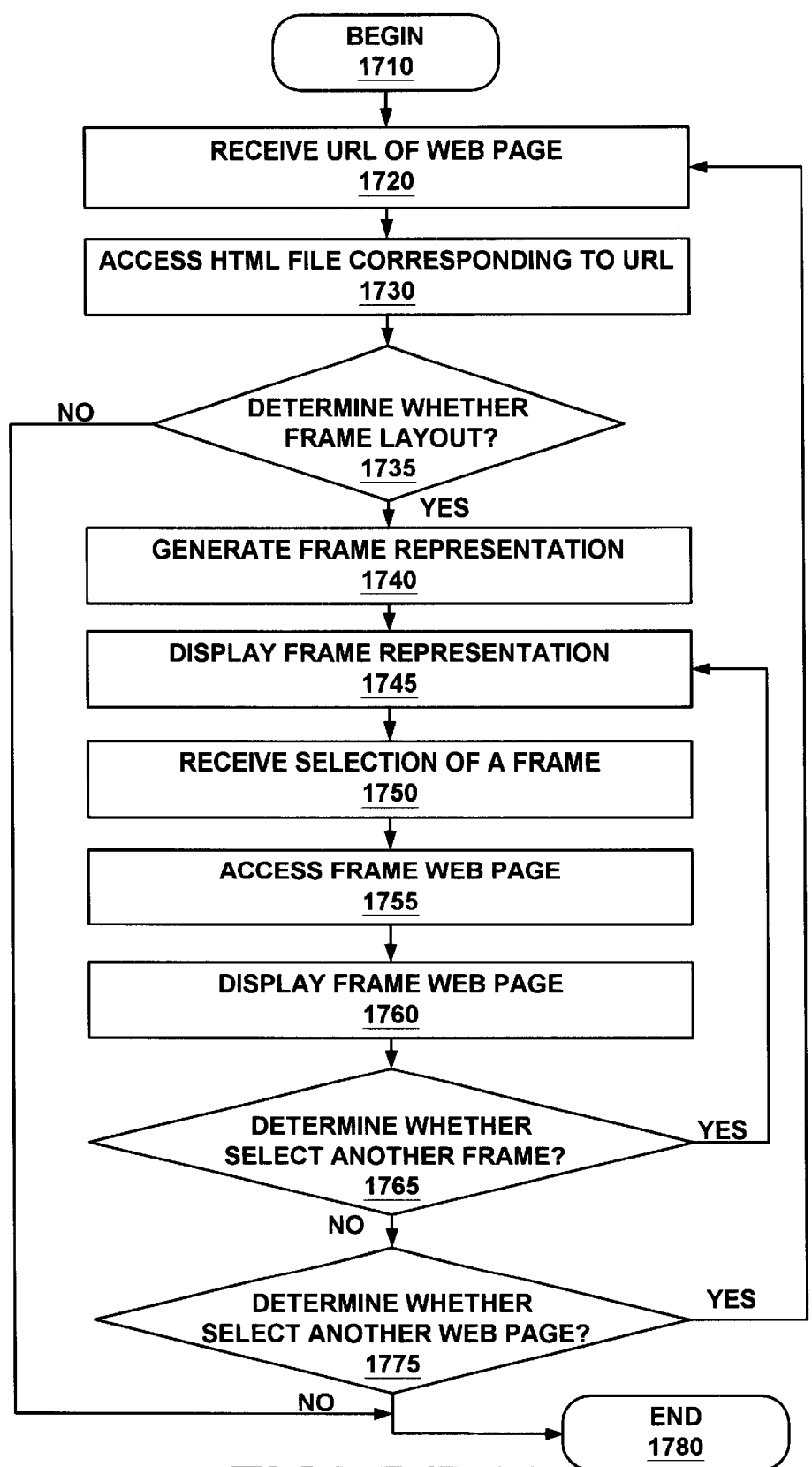
FIG. 10 illustrates a flow chart diagram of steps performed in accordance with one embodiment of the present invention for displaying a Web page on a small-sized electronic display device of the personal digital assistant.

FIG. 10 illustrates a flow chart diagram 1700 of steps performed in accordance with one embodiment of the present invention for displaying a Web page on a small-sized electronic display device 105 of the personal digital assistant 100. Moreover, the present invention can be practiced in conjunction with other small-sized electronic display devices which are coupled to other electronic systems or electronic devices (e.g., cellular phones, pagers, etc.).

At step 1710, the user invokes an application for displaying a Web page on a small-sized electronic display device 105. Additionally, the user inputs the URL of the Web page.

At step 1720, the application receives the URL of the Web page. At step 1730, the application utilizes the URL to access and to retrieve an HTML file of the Web page from the Internet.

At step 1735, the application determines whether the Web page (or HTML file) includes a frame layout. At step 1780, if it is determined that the Web page does not include a frame layout, the method of the present invention ends.

At step 1740, if it is determined that the Web page includes a frame layout, the application of the present invention generates a frame representation, which includes a plurality of geometric frame identifiers each corresponding to one of the frames of the Web page. In one embodiment, the frame representation is another Web page. At step 1745, the application displays the frame representation on the small-sized electronic display device 105.

At step 1750, the application receives the user's selection of a geometric frame identifier. At step 1755, the application utilizes the URL associated with the geometric frame identifier selected by the user to access and to retrieve an HTML file of the frame corresponding to the selected geometric frame identifier from the Internet. At step 1760, the application displays on the small-sized electronic display device 105 the frame according to the instructions provided by the HTML file in regard to the content of the frame and the manner of displaying the frame. As discussed above, the frame is a type of Web page.

At step 1765, it is determined whether the user desires to view another frame from the frame representation. If it is determined that the user desires to view another frame, the application returns to step 1745, otherwise the application continues to step 1770.

At step 1770, the application determines whether the user desires to view another Web page. If it is determined that the user desires to view another Web page, the application returns to step 1720, otherwise the application continues to step 1780 and concludes the operations of the present invention.

Figure 11:
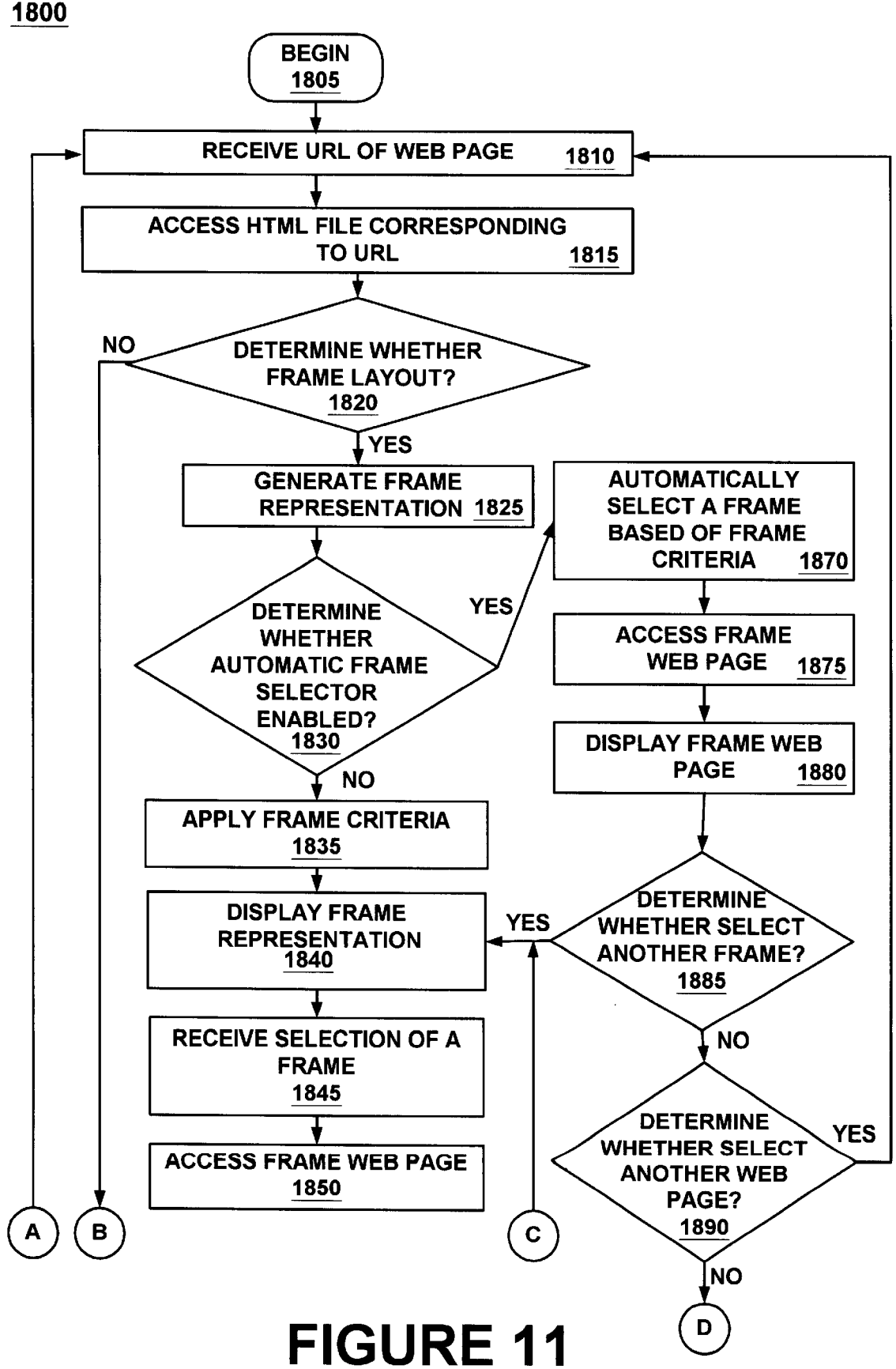
FIG. 11 illustrates a flow chart diagram of steps performed in accordance with another embodiment of the present invention for displaying a Web page on a small-sized electronic display device of the personal digital assistant.
Figure 11:
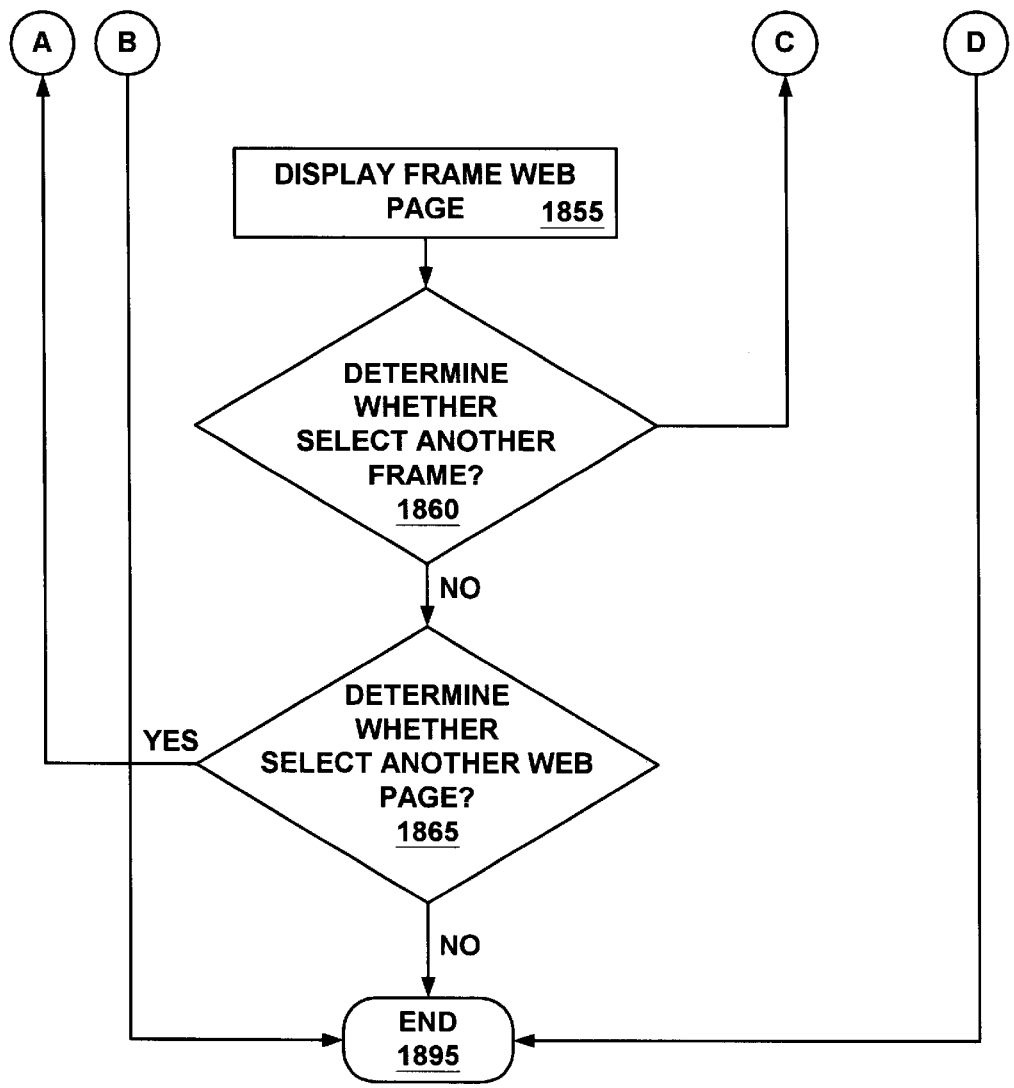

Intelligent Selection of Frame to View on a Small-Sized Electronic Display Device FIG. 11 illustrates a flow chart diagram 1800 of steps performed in accordance with another embodiment of the present invention for displaying a Web page on a small-sized electronic display device 105 of the personal digital assistant 100. Moreover, the present invention can be practiced in conjunction with other small-sized electronic display devices which are coupled to other electronic systems or electronic devices (e.g., cellular phones, pagers, etc.). In this embodiment, application is designed to apply a plurality of frame criteria to the frames of a Web page so that a user can more rapidly determine which frame deserves the user's attention and should be selected.

At step 1805, the user invokes an application for displaying a Web page on a small-sized electronic display device 105. Additionally, the user inputs the URL of the Web page. Moreover, the user enables an automatic frame selector feature if the user desires to allow the application to automatically select a frame of the Web page according to specific frame criteria. The frame criteria could include, for example, selecting the frame with the largest dimensions, selecting the frame which includes frame content having particular keywords, selecting the frame having a particular name, or any other appropriate frame criteria. Moreover, the frame criteria can be specified by the user. Alternatively, the frame criteria can be preprogrammed into the application. The application provides the user the opportunity to enable the automatic frame selector feature.

At step 1810, the application receives the URL of the Web page. At step 1815, the application utilizes the URL to access and to retrieve an HTML file of the Web page from the Internet.

At step 1820, the application determines whether the Web page (or HTML file) includes a frame layout. At step 1895, if it is determined that the Web page does not include a frame layout, the method of the present invention ends.

At step 1825, if it is determined that the Web page includes a frame layout, the application of the present invention generates a frame representation, which includes a plurality of geometric frame identifiers each corresponding to one of the frames of the Web page. In one embodiment, the frame representation is another Web page.

At step 1830, the application determines whether the automatic frame selector feature is enabled. At step 1835, if it is determined that the automatic frame selector feature is not enabled, the application applies the frame criteria to the frames of the Web page.

At step 1840, the application displays the frame representation on the small-sized electronic display device 105. In addition, the application modifies the geometric frame identifier corresponding to the frame which satisfies the frame criteria so that to communicate this fact (which frame satisfies the frame criteria) to the user. For example, the geometric frame identifier can be displayed in a different color, can be enlarged with respect to the other geometric frame identifiers, or can be modified in any other appropriate manner.

At step 1845, the application receives the user's selection of a geometric frame identifier. At step 1850, the application utilizes the URL associated with the geometric frame identifier selected by the user to access and to retrieve an HTML file of the frame corresponding to the selected geometric frame identifier from the Internet. At step 1855, the application displays on the small-sized electronic display device 105 the frame according to the instructions provided by the HTML file in regard to the content of the frame and the manner of displaying the frame. As discussed above, the frame is a type of Web page.

At step 1860, it is determined whether the user desires to view another frame from the frame representation. If it is determined that the user desires to view another frame, the application returns to step 1840, otherwise the application continues to step 1865.

At step 1865, the application determines whether the user desires to view another Web page. If it is determined that the user desires to view another Web page, the application returns to step 1810, otherwise the application continues to step 1895 and concludes the operations of the present invention.

At step 1870, if its is determined that the automatic frame selector feature is enabled, the application applies the frame criteria to the frames of the Web page and automatically selects a frame based on the frame criteria. Moreover, the application selects a geometric frame identifier corresponding to the frame which satisfies the frame criteria.

At step 1875, the application utilizes the URL associated with the geometric frame identifier to access and to retrieve an HTML file of the frame corresponding to the selected geometric frame identifier from the Internet. At step 1880, the application displays on the small-sized electronic display device 105 the frame according to the instructions provided by the HTML file in regard to the content of the frame and the manner of displaying the frame. As discussed above, the frame is a type of Web page.

At step 1885, it is determined whether the user desires to view another frame from the frame representation. If it is determined that the user desires to view another frame, the application proceeds to step 1840, otherwise the application continues to step 1890.

At step 1890, the application determines whether the user desires to view another Web page. If it is determined that the user desires to view another Web page, the application returns to step 1810, otherwise the application continues to step 1895 and concludes the operations of the present invention.

Generation of a Frame Representation

Figure 12:
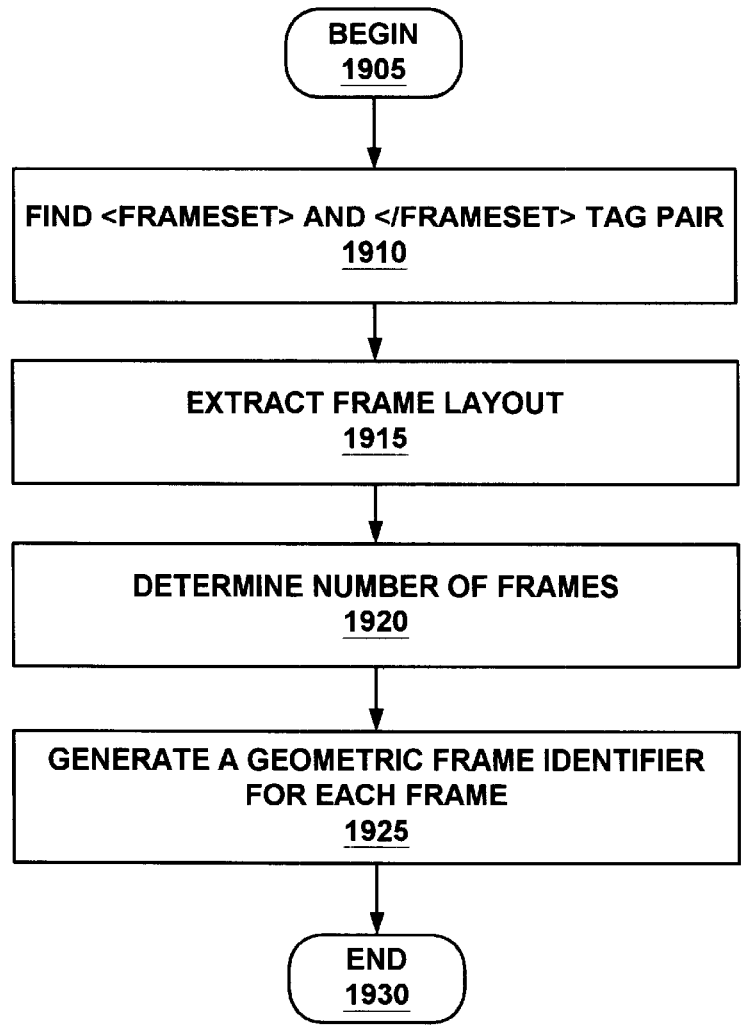
FIG. 12 illustrates a flow chart diagram of steps performed in accordance with one embodiment of the present invention for generating a frame representation for displaying on a small-sized electronic display device of the personal digital assistant.

FIG. 12 illustrates a flow chart diagram 1900 of steps performed in accordance with one embodiment of the present invention for generating a frame representation (e.g., step 1720 in FIG. 10 or step 1825 in FIG. 11) for displaying on a small-sized electronic display device 105 of the personal digital assistant 100. Moreover, the present invention can be practiced in conjunction with other small-sized electronic display devices which are coupled to other electronic systems or electronic devices (e.g., cellular phones, pagers, etc.).

At step 1905, the application receives the HTML file of the Web page. At step 1910, the application examines the HTML file and locates the tag keywords <frameset> and </frameset>.

At step 1915, the application extracts the frame layout from the HTML, whereas the frame layout is located between the tag keywords <frameset> and </frameset>. At step 1920, the application determines the number of frames incorporated into the Web page by examining the frame layout. At step 1925, the application generates a geometric frame identifier for each frame, whereas each geometric frame identifier is configured as discussed above. At step 1930, the method of the present invention ends.

Those skilled in the art will recognize that the present invention may be incorporated as computer instructions stored as computer program code on a computer-readable medium such as a magnetic disk, CD-ROM, and other media common in the art or that may yet be developed.

Finally, one of the embodiments of the present invention is an application, namely, a set of instructions (e.g., program code) which may, for example, be resident in the random access memory of an electronic system (e.g., computer system, personal digital assistant or palmtop computer system, etc.). Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. Thus, the present invention may be implemented as a computer program product for use in a computer system (e.g., personal digital assistant). In addition, although the various methods of the present invention described above are conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of displaying content of a multi-frame Web page having a plurality of frames on an electronic display device, said method comprising the steps of:

a) generating a frame representation for indicating a frame layout associated with said multi-frame Web page, wherein said frame representation includes a plurality of geometric frame identifiers each corresponding to a corresponding frame of said plurality of frames, each geometric frame identifier being configured for individual selection thereof; and b) displaying said frame representation on said electronic display device; and c) displaying a selected frame corresponding to a selected geometric frame identifier in response to said selected geometric frame identifier being selected.

2. A method as recited in claim 1 further comprising the step of providing a user interface for enabling a user to select said selected geometric frame identifier by interacting with said selected geometric frame identifier on said electronic display device.

3. A method as recited in claim 1 further comprising the step of providing an automatic frame selector for automatically selecting said selected geometric frame identifier in accordance with a plurality of frame criteria.

4. A method as recited in claim 1 wherein the step a) comprises the steps of:

a1) retrieving a first data file associated with said multi-frame Web page, wherein said first data file includes layout data for defining said frame layout;

a2) determining said frame layout by processing said layout data, wherein said layout data defines a plurality of frame attributes for each frame of said plurality of frames; and a3) generating one of said geometric frame identifiers for each frame of said plurality of frames.

5. A method as recited in claim 1 further comprising the steps of:

identifying a particular frame of said plurality of frames by applying a plurality of frame criteria to each frame of said plurality of frames; and modifying a particular geometric frame identifier of said plurality of geometric frame identifiers corresponding to said particular frame such that to distinguish said particular geometric frame identifier from other geometric frame identifiers.

6. A method as recited in claim 1 wherein the step c) comprises the steps of:

c1) retrieving a second data file associated with said selected frame, wherein said second data file includes data for displaying said selected frame on said electronic display device; and c2) processing said second data file such that to display said selected frame.

7. A method as recited in claim 1 wherein said frame representation comprises another Web page.

8. A method as recited in claim 1 wherein each geometric frame identifier includes a size which is automatically determined based on said corresponding frame.

9. A method as recited in claim 1 wherein each geometric frame identifier includes a label, wherein said label is automatically determined based on content associated with said corresponding frame.

10. A method as recited in claim 1 wherein each geometric frame identifier includes a label, and further comprising the step of providing a user interface for enabling a user to select said selected geometric frame identifier by selecting said label of said selected geometric frame identifier.

11. A method as recited in claim 1 wherein each geometric frame identifier is positioned on said electronic display device based on a position of said corresponding frame.

12. A method as recited in claim 1 wherein each geometric frame identifier is associated with a Uniform Resource Locator (URL) corresponding to said corresponding frame.

13. A method as recited in claim 1 wherein said electronic display device is coupled to an electronic system.

14. A method as recited in claim 13 wherein said electronic system is a palmtop computer system.

15. A method of viewing a multi-frame Web page having a plurality of frames on an electronic display device, said method comprising the steps of:

a) determining a frame layout associated with said multi-frame Web page;

b) generating a frame representation for indicating said frame layout, wherein said frame representation includes a plurality of geometric frame identifiers each corresponding to a corresponding frame of said plurality of frames, each geometric frame identifier being configured for individual selection by a user;

c) displaying said frame representation on said electronic display device such that said user can select anyone of said plurality of geometric frame identifiers to view a corresponding one of said plurality of frames; and d) displaying on said electronic display device a selected frame corresponding to a selected geometric frame identifier in response to said user selecting said selected geometric frame identifier.

16. A method as recited in claim 15 further comprising the step of providing a user interface for enabling a user to select said selected geometric frame identifier by interacting with said selected geometric frame identifier on said electronic display device.

17. A method as recited in claim 15 further comprising the steps of:

identifying a particular frame of said plurality of frames by applying a plurality of frame criteria to each frame of said plurality of frames; and modifying a particular geometric frame identifier of said plurality of geometric frame identifiers corresponding to said particular frame such that to distinguish said particular geometric frame identifier from other geometric frame identifiers.

18. A method as recited in claim 15 wherein said frame representation comprises another Web page.

19. A method as recited in claim 15 wherein each geometric frame identifier includes a size which is automatically determined based on said corresponding frame.

20. A method as recited in claim 15 wherein each geometric frame identifier includes a label, wherein said label is automatically determined based on content associated with said corresponding frame.

21. A method as recited in claim 15 wherein each geometric frame identifier includes a label, and further comprising the step of providing a user interface for enabling a user to select said selected geometric frame identifier by selecting said label of said selected geometric frame identifier.

22. A method as recited in claim 15 wherein each geometric frame identifier is positioned on said electronic display device based on a position of said corresponding frame.

23. A method as recited in claim 15 wherein each geometric frame identifier is associated with a Uniform Resource Locator (URL) corresponding to said corresponding frame.

24. A method as recited in claim 15 wherein said electronic display device is coupled to an electronic system.

25. A method as recited in claim 24 wherein said electronic system is a palmtop computer system.

26. An electronic system comprising:

a processor coupled to a bus;

an electronic display device coupled to said bus;

a computer-readable medium coupled to said bus and having computer-executable instructions for performing a method of displaying content of a multi-frame Web page having a plurality of frames on said electronic display device, said method comprising the steps of:
   a) generating a frame representation for indicating a frame layout associated with said multi-frame Web page, wherein said frame representation includes a plurality of geometric frame identifiers each corresponding to a corresponding frame of said plurality of frames, each geometric frame identifier being configured for individual selection thereof; and
   b) displaying said frame representation on said electronic display device; and
   c) displaying a selected frame corresponding to a selected geometric frame identifier in response to said selected geometric frame identifier being selected.

27. An electronic system as recited in claim 26 wherein said electronic system comprises a palmtop computer system.

* * * * *